(12) United States Patent
Nakamura

(10) Patent No.: US 7,213,180 B2
(45) Date of Patent: May 1, 2007

(54) BUS BRIDGE CIRCUIT, BUS CONNECTION SYSTEM, AND DATA ERROR NOTIFICATION METHOD FOR BUS BRIDGE CIRCUIT

(75) Inventor: Yuji Nakamura, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 588 days.

(21) Appl. No.: 10/743,140

(22) Filed: Dec. 23, 2003

(65) Prior Publication Data
US 2004/0139269 A1 Jul. 15, 2004

(30) Foreign Application Priority Data
Jan. 14, 2003 (JP) .............................. 2003-005284

(51) Int. Cl.
*G06F 11/00* (2006.01)
(52) U.S. Cl. .......................................... 714/52; 710/65
(58) Field of Classification Search .................. 714/52; 710/64, 65
See application file for complete search history.

(56) References Cited
U.S. PATENT DOCUMENTS
5,155,843 A * 10/1992 Stamm et al. .................. 714/5
5,404,482 A * 4/1995 Stamm et al. ............... 711/145
6,934,903 B1 * 8/2005 Keltcher et al. ............ 714/763
6,975,752 B2 * 12/2005 Dixon et al. ................ 382/132
2002/0046366 A1 * 4/2002 Ono ............................ 714/43
2004/0172581 A1 * 9/2004 Tamura et al. .............. 714/718

FOREIGN PATENT DOCUMENTS
JP 9-081502 3/1997

* cited by examiner

Primary Examiner—Bryce P. Bonzo
(74) Attorney, Agent, or Firm—Staas & Halsey LLP (57) ABSTRACT

A bus bridge circuit is connected to first and second buses and performs data transfer between devices. In the bus bridge circuit, a new parity bit is generated from a parity bit generated by a first PCI device and from a byte enable signal from a second PCI device, and is transmitted to the second PCI device, together with read data from the first PCI device. Consequently even if the byte enable values are different on the primary-side and secondary-side buses, parity errors on the secondary-side bus can be correctly transmitted to the primary-side bus.

15 Claims, 7 Drawing Sheets

NORMAL

| | INITIATOR-SITE BUS | COMPLEMENTARY-SIDE BUS | NOTES |
|---|---|---|---|
| READ DATA (AD) | 0x0000_0000 (32bits) | 0x0000_0000 (32bits) | TRANSFER DIRECTLY FROM COMPLEMENTARY TO INITIAOR |
| BYTE·ENABLE (CBE) | 1000 (4bits) (A) | 0000 (4bits) | VALUE OF COMPLEMENTALY SIDE IS ALWAYS ALL "0", VALUE OF INITIATOR SIDE IS NOT PREDICTED |
| PARITY (PAR) | 1 (1bits) (C) | 0 (1bits) (B) | CORRECTLY CREATE BY XOR OF PARITY (C), BYTE ENABLE (A) AND PARITY (B) |

PARITY ERROR

| | INITIATOR-SITE BUS | COMPLEMENTARY-SIDE BUS | NOTES |
|---|---|---|---|
| READ DATA (AD) | 0x0000_1000 (32bits) | 0x0000_1000 (32bits) | TRANSFER DIRECTLY FROM COMPLEMENTARY TO INITIAOR |
| BYTE·ENABLE (CBE) | 1000 (4bits) (A) | 0000 (4bits) | VALUE OF COMPLEMENTALY SIDE IS ALWAYS ALL "0", VALUE OF INITIATOR SIDE IS NOT PREDICTED |
| PARITY (PAR) | 1 (1bits) (C) | 0 (1bits) (B) | PARITY OF COMPLEMENTARY SIDE IS ERROR VALUE. ERROR PARITY IS TRANSMITTED BY XOR OF PARITY (C), BYTE ENABLE (A) AND PARITY (B) |

BUS BRIDGE CIRCUIT, BUS CONNECTION SYSTEM, AND DATA ERROR NOTIFICATION METHOD FOR BUS BRIDGE CIRCUIT

CROSS-REFERENCE TO RELATED APPLICATIONS

This application is based upon and claims the benefit of priority from the prior Japanese Patent Application No. 2003-005284, filed on Jan. 14, 2003, the entire contents of which are incorporated herein by reference.

BACKGROUND OF THE INVENTION

1. Field of the Invention

This invention relates to a bus bridge circuit connecting two PCI buses or other buses to transfer data between two buses, a bus connection system, and a data error notification method for the bus bridge circuit, and in particular relates to a bus bridge circuit which provides notification of parity errors in data transfers between two buses, a bus connection system, and a data error notification method for the bus bridge circuit.

2. Description of the Related Art

Various functional devices are connected by buses in computer systems to realize various functions. With the spread of personal computers in recent years, a controller and similar are constructed by connecting functional devices developed for personal computers with a Peripheral Component Interconnect (PCI) bus.

Figure 7:
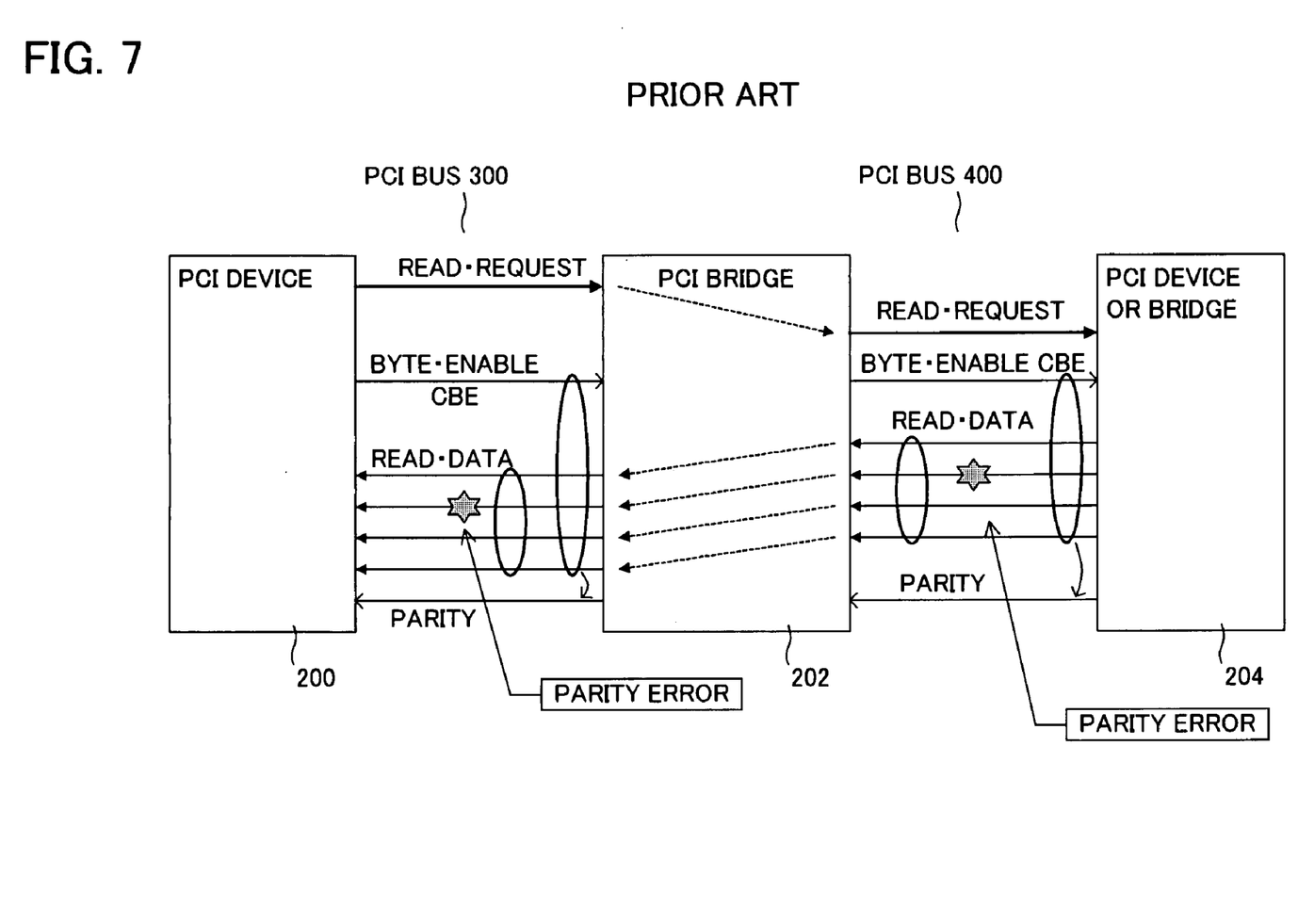
FIG. 7 is a drawing explaining a conventional PCI bridge circuit.

On the other hand, when devices with different functions are connected by a bus, it is effective to provide bridge circuits in the bus between devices. FIG. 7 is a drawing of the conventional configuration of a bridge circuit (PCI bridge circuit) connected to PCI buses.

The PCI bridge circuit 202 is connected to two PCI buses 300, 400, and performs data transfer between a PCI device 200 connected to the PCI bus 300, and a PCI device 204 connected to the PCI bus 400. The PCI bridge circuit 202 comprises a FIFO (fast-in fast-out) buffer which stores transfer data, and a control circuit which performs control as the target as seen by a PCI device, and also performs control as the master as seen by the other PCI device.

Here, when a read request is issued from the PCI device 200 to the PCI device 204, and the read data is transferred from the PCI device 204 to the PCI device 200 (called a "read operation"), a read request is issued from the PCI device 200 to the PCI bridge circuit 202. Then, the PCI bridge circuit 202 issues a read request to the PCI device 204, and data from the PCI device 204 is pre-fetched to the FIFO buffer via the primary-side PCI bus 400.

On the other hand, the PCB bus protocol provides a CBE (Command Byte Enable) function, so that the validity of data of the PCI bus width (for example, 64 bits=8 bytes, 32 bits=4 bytes) can be specified in byte units. That is, the data bits of the PCI bus width can be made valid or invalid in byte units, according to the number of data bits required by a PCI device connected to the PCI bus, to acquire the required transfer data from parallel transfer data.

Using this CBE function, for example, in the case of a PCI bus of width 32 bits, a 4-bit CBE signal is issued from the initiator (master) PCI device to control the validity/invalidity of the data in byte units.

Further, in order to protect this CBE signal and the read data (AD signal), during a read operation the XOR (exclusive-OR) of the CBE signal issued from the initiator PCI device to the target PCI device and the bits of all the data outputted by the target PCI device is taken, a parity signal (1 bit) is generated, and the parity signal is sent to the target PCI device.

For example, when performing a read operation across the PCI bridge 202 of FIG. 7, the parity for the PCI bus 400 on the target side is generated by XOR'ing the CBE signal issued by the PCI bridge circuit 202 and the read data of the PCI device 204, and the parity for the PCI bus 300 on the initiator side is generated by XOR'ing the CBE signal issued by the PCI device 200 and the read data outputted by the PCI bridge circuit 202.

In the PCI devices 300, 400 on both sides of the PCI bridge circuit 202, the read data has the same value, so that if both CBE signals are the same, the parity will be the same, and it is sufficient for the PCI bridge circuit to transmit to the PCI device 200 the unmodified parity signal received from the PCI device 204, without generating a parity signal.

However, as stated above, because the CBE signal can be changed, in the prior art the PCI bridge circuit 202 generates the parity of the PCI device 200 on the initiator side by XOR'ing the CBE signal issued by the PCI device 200 and the read data outputted by the PCI bridge circuit 202.

On the other hand, when the PCI bridge circuit 202 pre-fetches data from the PCI device 204, the value of the CBE signal on the initiator side cannot be predicted, so that during reading the CBE signals from the PCI bridge circuit 202 are all set to valid (CBE signals are all "0"), to enable accommodation of different patterns of valid bits determined by CBE signals from the initiator-side PCI device 200.

That is, there are cases in which the CBE signal values are different on the two sides of the PCI bridge circuit 202. Consequently when the PCI bridge circuit 202 receives a read request from the PCI device 200, if there is a parity error in data pre-fetched from the PCI device 204, the erroneous pre-fetched data and the CBE signal are used to generate the parity, and so there is the problem that the PCI device 200, on receiving this parity signal, cannot recognize the parity error.

SUMMARY OF THE INVENTION

Thus, an object of this invention is to provide a bus bridge circuit, bus connection system, and data error notification method for a bus bridge circuit to notify an initiator-side device of data errors in data pre-fetched by the bus bridge circuit.

A further object of this invention is to provide a bus bridge circuit, bus connection system, and data error notification method for a bus bridge circuit to prevent recognition by an initiator-side device of erroneous data as correct data when a data error occurs in data pre-fetched by the bus bridge circuit.

Still another object of this invention is to provide a bus bridge circuit, bus connection system, and data error notification method for a bus bridge circuit, employing a simple configuration, to notify an initiator-side device of data errors in data pre-fetched by the bus bridge circuit.

In order to attain these objects, a bus bridge circuit of this invention issues a read request to a first device in response to a read request from a second device, receives data from the first device via a first bus, and transfers the data to the second device via a second bus and has a data buffer, which receives and stores the data of the first device, and error detection information generated from the data and from byte enable signals specifying, in units of a prescribed number of bits, the parallel data from the bus bridge circuit on the first bus to be enabled; an error detection information generation circuit, which generates new error detection information from byte enable signals specifying, in units of a prescribed number of bits, the parallel data from the second device on the second bus to be enabled, and from error detection data received in the data buffer; and a controller, which transfers to the second device via the second bus the data of the data buffer and the new error detection information, according to the byte enable signals of the second device.

A bus connection system of this invention has a second device which issues read requests, a first device which outputs read data in response to the above read requests, and a bus bridge circuit, which is connected to the second device by a second bus and is connected to the first device by a first bus, and transfers read data from the first device via the first bus to the second device via the second bus. And the first device outputs the read data and bus error detection information generated from the read data and from the byte enable signals specifying, in units of a prescribed number of bits the parallel data from the bus bridge circuit on the first bus to be enabled, to the first bus; and the bus bridge circuit has a data buffer which receives and stores the read data from the first bus and the error detection information, an error detection information generation circuit which generates new error detection information from byte enable signals specifying, in units of a prescribed number of bits, the parallel data from the second device on the second bus to be enabled and from error detection information received in the data buffer, and a controller which transfers to the second device via the second bus the data in the data buffer and the new error detection information, in response to the byte enable signals of the second device.

Further, a data error notification method for a bus bridge circuit of this invention issues a read request to a first device in response to a read request from a second device, receives data from the first device via a first bus, and transfers the data to the second device via a second bus, and has a step of receiving and storing in a data buffer, the data of the above first bus and error detection information generated from the data and from byte enable signals specifying, in units of a prescribed number of bits, the parallel data from the bus bridge circuit on the first bus to be enabled; an error detection information generation step of generating new error detection information from byte enable signals specifying, in units of a prescribed number of bits, the parallel data from the above second device on the second bus to be enabled, and from error detection information received in the data buffer; and a step of transferring the data buffer data and the new error detection information to the second device via the second bus, in response to the byte enable signals of the second device.

In this invention, new error detection information is generated from error detection information generated by the first device and from byte enable signals specifying, in units of a prescribed number of bits, the parallel data from the second device on the second bus to be enabled, and the new error detection information is transferred, together with the read data, to the second device, so that even if byte enable values are different on the primary-side and secondary-side buses, data errors (parity errors) on the secondary-side bus can be correctly transmitted to the primary-side bus. Further, this function can be realized easily and at low cost through the addition of a simple circuit.

In this invention, it is preferable that the above controller transmits the byte enable signals, to pre-fetch the data of the first device, to the above first device. As a result, changes in enabled bytes for the second device can be accommodated.

In this invention, it is preferable that the above error detection information generation circuit comprise an XOR circuit to take the XOR of the byte enable signals from the second device and the parity bits received by the above data buffer. As a result, new parity bits can be generated using a simple circuit.

Further in this invention, it is preferable that the controller transmit the byte enable signals in sequence to the first device, in response to ready signals from the first device responding to the read request sent to the first device, and moreover after storing data from the first device in the above data buffer, transmit a ready signal to the second device, and receives the byte enable signals from the second device. As a result, correct notification of parity is possible without modifying the PCI protocol.

In this invention, it is preferable that the above data buffer comprises a FIFO buffer, so that transmission control, including parity bits and other data errors, is easily performed.

DESCRIPTION OF THE PREFERRED EMBODIMENTS

Below, aspects of the invention are explained, in the order PCI bus connection systems, PCI bridge circuits, and other embodiments.

(PCI Bus Connection Systems)

Figure 1:
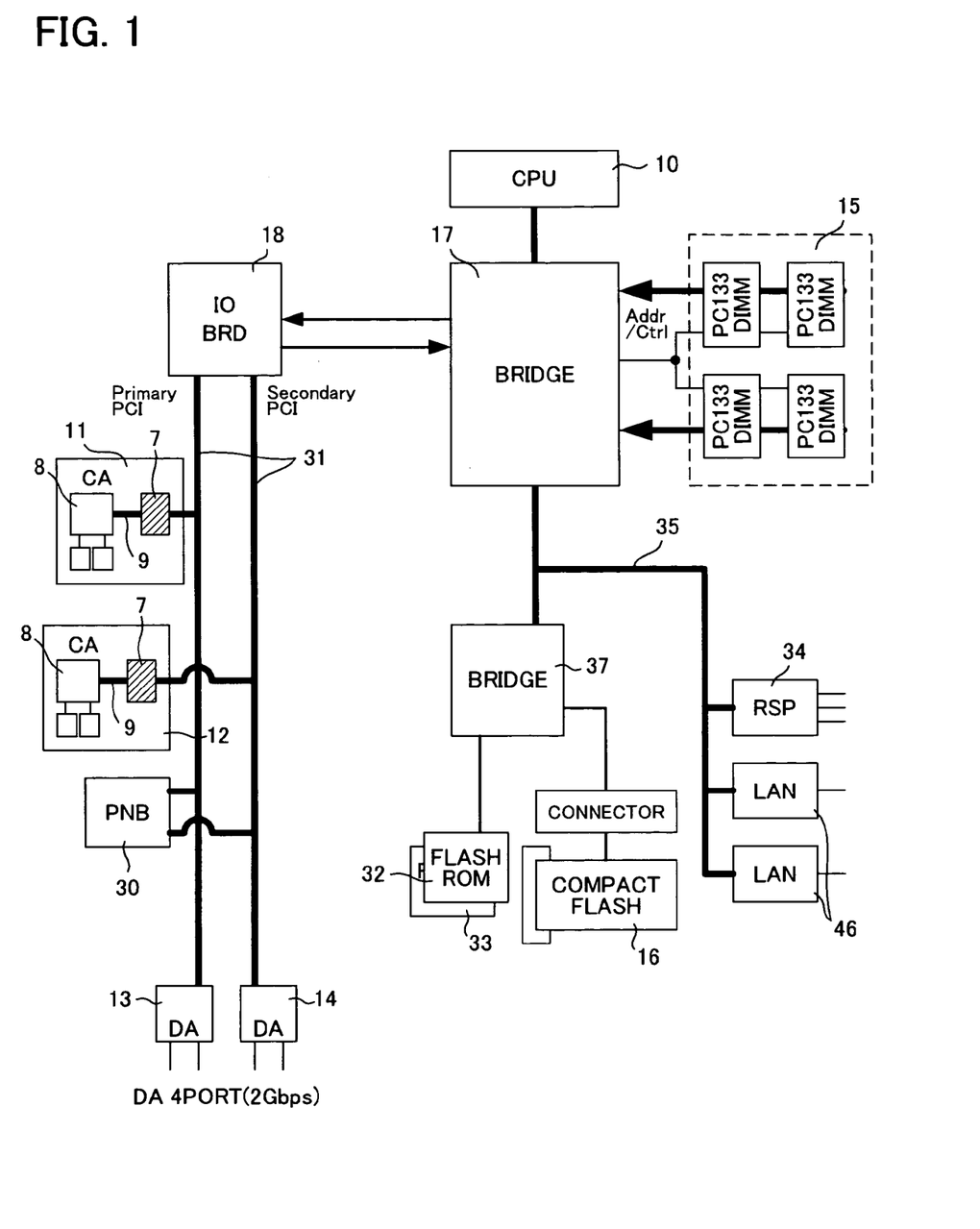
FIG. 1 is a block diagram of a PCI bus connection system of one embodiment of this invention.
Figure 2:
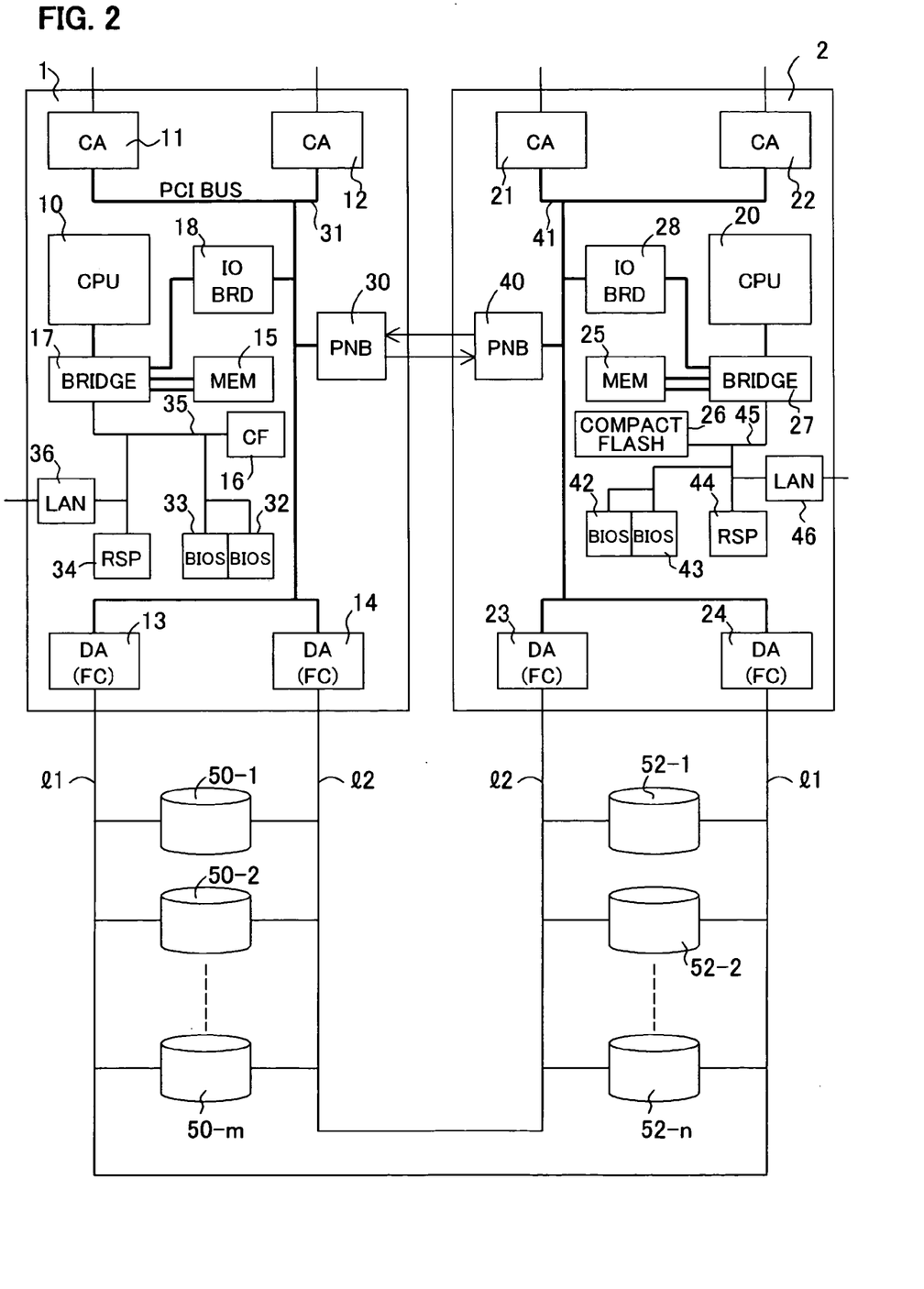
FIG. 2 is a drawing of the configuration of a storage system to which the configuration of FIG. 1 is applied.

FIG. 1 is a drawing of the configuration of a PCI bus connection system in one embodiment of this invention; FIG. 2 is a drawing of the configuration of a storage system in which the PCI connection system of FIG. 1 is used as a controller. FIG. 2 shows a RAID (Redundant Arrays of Inexpensive Disks) system using magnetic disks.

As shown in FIG. 2, the storage system comprises a pair of magnetic disk controllers (hereafter called "controllers") 1, 2, and plural magnetic disk devices 50-1 to 50-*m* and 52-1 to 52-*n*, connected by lines 11, 12 to this pair of controllers 1, 2.

The controllers 1, 2 are connected, either directly or via network equipment, to a host and server, in a system enabling rapid random-access writing and reading of large amounts of data of the host and server to and from RAID disk drives (magnetic disk devices).

The pair of controllers 1, 2 have the same configuration, comprising as function modules CAs (Channel Adapters) 11, 12, 21, 22, CMs (Centralized Modules) 10, 15 to 19, 20, and 25 to 29, and DAs (Device Adapters) 13, 14, 23, 24.

The CAs (Channel Adapters) 11, 12, 21, 22 are circuits which govern control of the host interface linking the host, and as explained below, comprise fiber channel controllers and similar. The DAs (Device Adapters) 13, 14, 23, 24 are circuits which exchange commands and data with disk devices in order to control the disk devices 50-1 to 50-*m* and 52-1 to 52-*n*, and comprise, for example, fiber channel (FC) circuits, DMA circuits and similar.

The CMs (Centralized Modules) have CPUs 10, 20; bridge circuits 17, 27; memory (RAM) 15, 25; compact flash memory 16, 26; IO bridge circuits 18, 28; and pairs of BIOS flash memory 32, 33 and 42, 43.

The CMs also have RSPs (Remote Service Processors) 34, 44 and LAN ports for external connection 36, 46. The memory 15, 25 are backed up by batteries, and are used as main memory.

The CPUs 10, 20 are connected, via the bridge circuits 17, 27, to the memory 15, 25, the compact flash memory 16, 26, and the IO bridge circuits 18, 28. The memory 15, 25 are used as work area and cache area by the CPUs 10, 20, and the compact flash memory 19, 29 stores the programs to be executed by the CPUs 10, 20. As such programs, a kernel, file access program (read/write program), RAID management program, and similar are stored.

BIOS flash memory 32, 33, 42, 43 is provided in a paired configuration for redundancy, one used for operation and the other for standby, storing the BIOS. The CPUs 10, 20 execute these programs, and execute read/write processing, RAID management processing and similar.

The PCI buses 35, 45 are connected via the bridge circuits 17, 27 to the CPUs 10, 20, the compact flash memory 15, 25, the pairs of BIOS flash memory 32, 33, 42, 43, the RSPs 34, 44, and the LAN ports 36, 46.

The RSPs 34, 44 comprise processors which perform various state management and remote services. The LAN ports 36, 46 are used for connection to external LANs (Local Area Networks).

The PCI (Peripheral Component Interconnect) bus 31 connects the CAs 11, 12, 21, 22 and DAs 13, 14, 23, 24, and also connects the CPUs 10, 20 and memory 15, 25 via the IO bridge circuits 18, 28. The PCI bus 31 is also connected to the PCI node link bridge (PNB) circuits 30, 40.

The PCI node link bridge circuit 30 of the controller 1 is connected to the PCI node link bridge circuit 40 of the controller 2, to exchange commands and data between the controllers 1, 2.

The controller 1 controls, for example, the disk devices 50-1 to 50-*m*, and the controller 2 controls, for example, the disk devices 52-1 to 52-*n*. In FIG. 2, the disk devices 50-1 to 50-*m* and 52-1 to 52-*n* have a RAID5 configuration.

FIG. 1 shows in detail the configuration of the controller 1 only; components which are the same as in FIG. 2 are assigned the same symbols. Controller 2 has the same configuration. In FIG. 1, the CAs 11, 12 each comprise a PCI bridge circuit 7, PCI bus 9, and an FCC (fiber channel controller) 8 which is a PCI device.

That is, the CAs 11, 12 comprise a PCI bridge circuit 7, which is connected to the IO bridge circuit (PCI device) 18 via the first PCI bus 31; an FCC (PCI device) 8, and a second PCI bus 9 connected to the PCI bridge circuit 7 and FCC 8. The first PCI bus 31 is connected to the above-described PNB 30 and DAS 13, 14.

That is, the input/output system bus connects, through the IO bridge circuit 18, the data processing system (CPU 10, memory 15, 32, 33, 16 and similar) and the input/output system. As described below using FIG. 3, the PCI bridge circuit 7, because a CRC (Cyclic Redundancy Code) is appended to the data of the storage system and a CRC is not appended to data from the host, appends a CRC to data from the host, and deletes the CRC from data for transmission to the host. The bridge circuit 37 is a bridge connecting the flash memory 32, 33 and compact flash memory 16, which are memory units with different properties, to the PCI bus 35.

(PCI Bridge Circuit)

Figure 3:
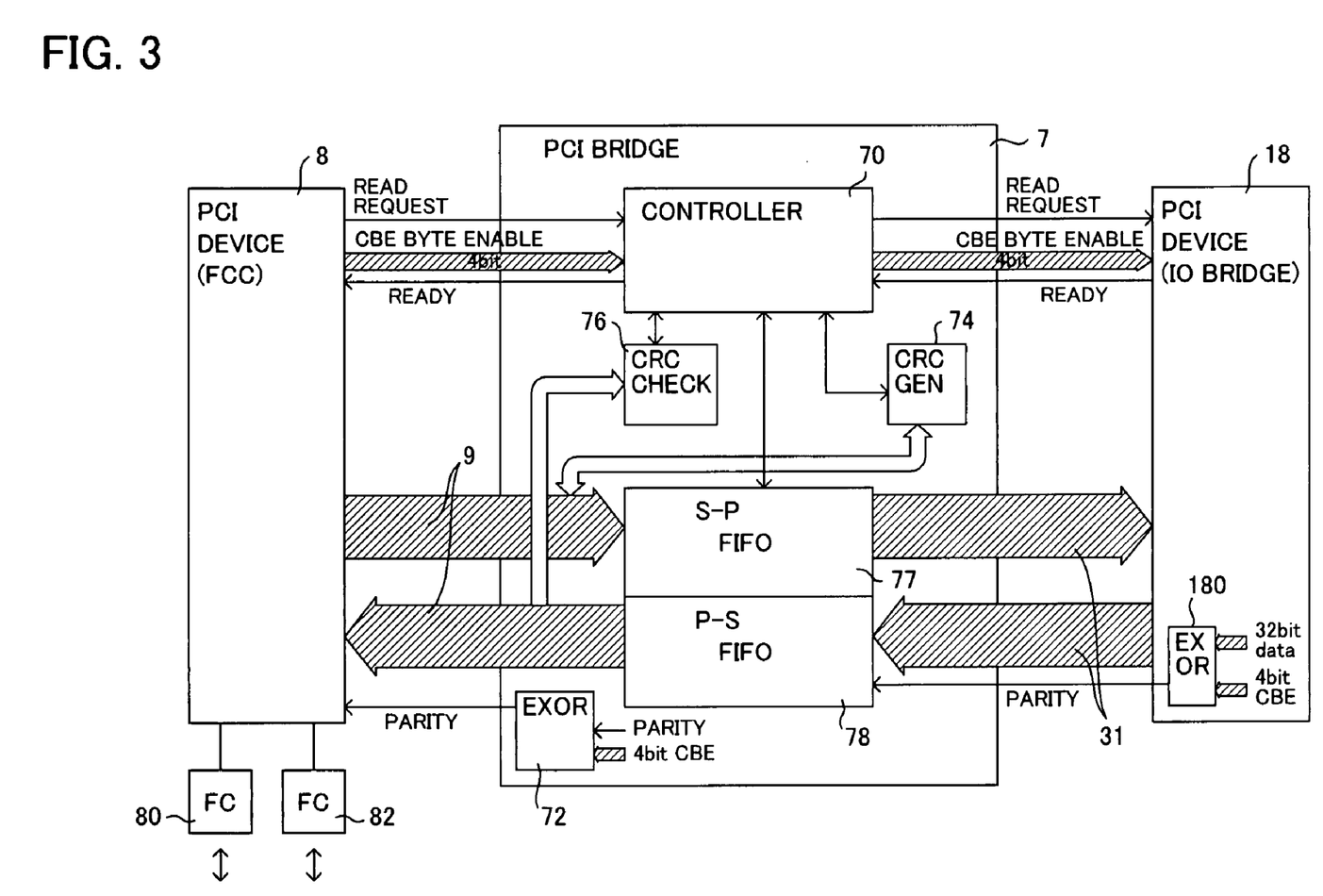
FIG. 3 is a drawing of the configuration of the PCI bridge circuit of FIG. 1.
Figure 4:
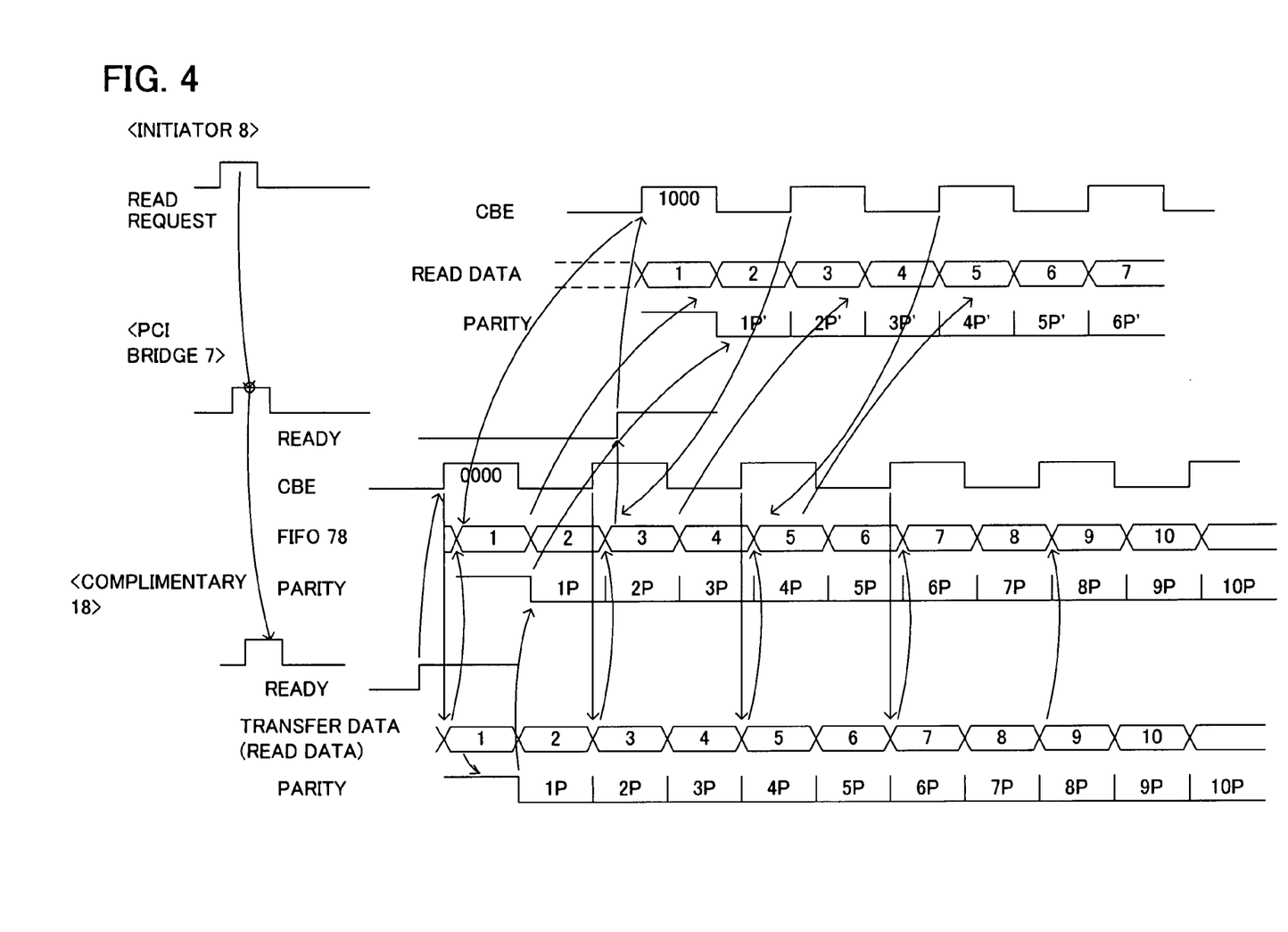
FIG. 4 is a timing chart of data transfer operations of the PCI bridge circuit of FIG. 3.
Figure 5:
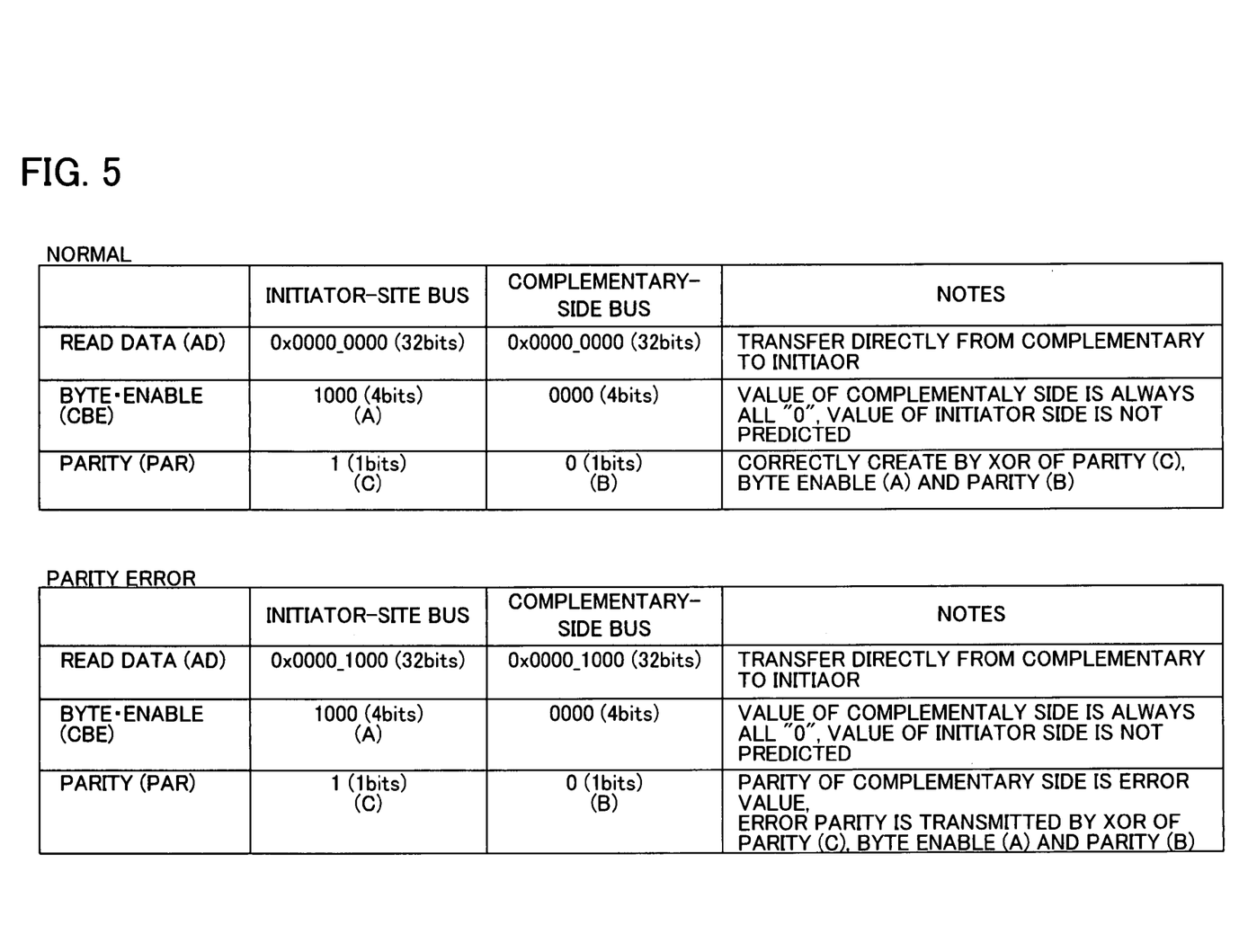
FIG. 5 is a drawing explaining an example of the parity generation processing of FIG. 3.
Figure 6:
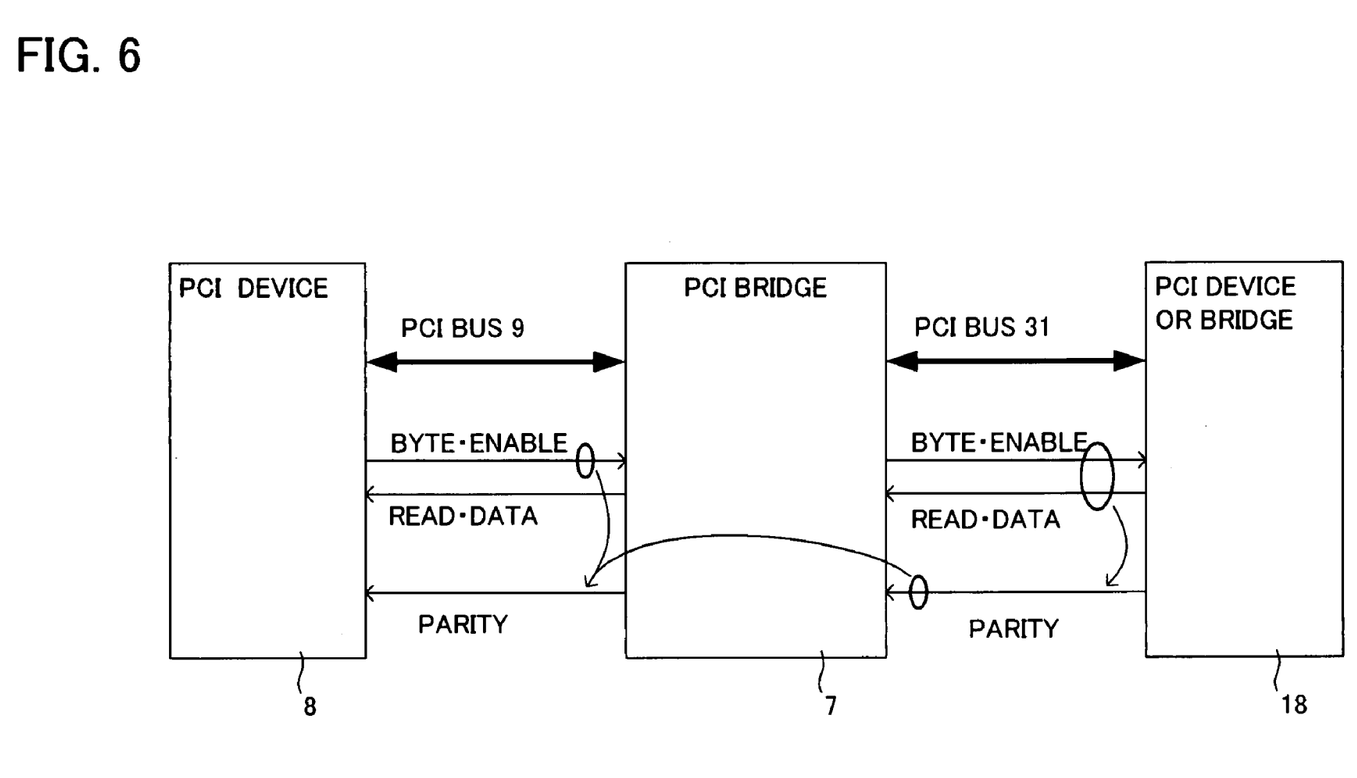
FIG. 6 is a drawing explaining the parity generation operation of FIG. 3.

Next, the PCI bridge circuit is explained. FIG. 3 is a block diagram of a PCI bridge circuit; FIG. 4 is a timing chart of data transfer operation via the PCI bridge circuit; FIG. 5 is a drawing explaining an example of parity appending; and FIG. 6 is a drawing explaining the parity generation operation of FIG. 3.

As shown in FIG. 3, the IO bridge circuit (PCI device) 18 is connected to the PCI bridge circuit 7 by the first PCI bus 31, and the PCI bridge circuit 7 is connected to the FCC (PCI device) 8 by the second PCI bus 9. A pair of FC transceivers 80, 82 are provided in the FCC 8. The FC transceivers 80, 82 are connected in an FC (fiber channel) loop, connecting the host and network.

The PCI bridge circuit 7 has an S-P (Secondary-Primary) FIFO (fast-in fast-out) buffer 77 which stores host data (transfer data) of the second PCI bus 9 from the PCI device 8 and transfers the data to the PCI device 18, and a P-S (Primary-Secondary) FIFO buffer 78 which stores the stored data (transfer data) of the first PCI bus 31 from the PCI device 18 and transfers the data to the PCI device 8.

The PCI bridge circuit 7 also has a CRC generation circuit 74, which receives host data of the second PCI bus 9, creates and appends a CRC to the host data, a CRC check circuit 76 which performs a CRC check of stored data for output to the second PCI bus 9 from the P-S FIFO buffer 78 and deletes the CRCs, and a controller 70 which controls the FIFO buffers 77, 78, the CRC generation circuit 74, and the CRC check circuit 76 according to ready signals.

The PCI device 18 has a parity generation circuit 180 which takes the XOR of the 32-bit read data and each of the bits of the CBE signal from the PCI bridge circuit 7, to generate a parity signal for the PCI bus 31. The controller 70 has a parity generation circuit 72 which takes the XOR of the parity signal received from the PCI device 18 and each of the bits of the CBE signal from the PCI device 8, to generate a parity signal for the PCI bus 9.

The operation of the configuration of FIG. 3 is explained using FIG. 4 through FIG. 6. After the initiator-side PCI device 8 issues a read request to the PCI bridge circuit 7, the PCI bridge circuit 7 performs internal processing conforming to the PCI bus protocol to acquire bus ownership, establishes a data transfer state with the target (complementary)-side PCI device 18, and issues a read request to the PCI device 18.

When preparations for read data transfer are completed, the complementary-side PCI device 18 returns a ready signal to the PCI bridge circuit 7. In response, the PCI bridge circuit 7 transmits a CBE signal (with all bits "0") to the PCI device 18. In response, the PCI device 18 outputs to the PCI bridge circuit 7 32-bit read data 1 and a parity bit P generated by the parity generation circuit 180.

Subsequently, in response to a CBE signal (with all bits "0") from the PCI bridge circuit 7, the PCI device 18 outputs to the PCI bridge circuit 7 the 32-bit read data 2, 3, . . . , and parity bits P generated by the parity generation circuit 180.

On the other hand, the PCI bridge circuit 7 stores the output read data and parity bits in the FIFO buffer 78, and after, at least, the 32-bit read data and parity bits are stored, a ready signal is sent to the initiator-side PCI device 8.

As a result, the PCI device 8 transmits a CBE signal (for example, "1000") to the PCI bridge circuit 7. In response, the PCI bridge circuit 7 outputs to the PCI device 8 the 32-bit read data 1 in the FIFO buffer 78, and the parity bits P' generated by the parity generation circuit 72.

Subsequently, in response to CBE signals ("1000") from the PCI device 8, the PCI bridge circuit 7 outputs the 32-bit read data 2, 3, . . . and the parity bits P' generated by the parity generation circuit 72 to the PCI device 8.

As shown in FIG. 6, the parity bits from the PCI device 18 are the consequence of an XOR operation on the 32-bit read data and the CBE signals from the PCI bridge circuit 7. That is, if the number of "1"s in the 32-bit read data and the CBE signal is odd, the parity bit P is "1", and if the number of "1"s is even, the parity bit P is "0".

On the other hand, a parity bit P' from the PCI bridge circuit 7 results from an XOR operation on a parity bit P from the PCI device 18 and a CBE signal from the PCI device 8. That is, if the number of "1"s in the parity bit P and the CBE signal is odd, the parity bit P' is "1", and if the number of "1"s is even, the parity bit P' is "0".

That is, as shown in FIG. 5, the CBE signal on the complementary-side bus 31 is "0000", so that the parity bit P is determined by the number of "1"s in the read data. On the other hand, on the initiator-side bus 9, the parity bit P' is determined by the number of "1"s in the parity bit P and the CBE signal.

Hence as shown for the normal case in FIG. 5, when there are no 1-bit errors in the read data, the parity bit P' is "1" if the number of "1"s in the 32-bit read data and the CBE signal from the PCI device 8 is odd, and "0" if the number of "1"s is even.

Similarly, as shown for the case of a parity error in FIG. 5, when there is a 1-bit error in the read data, the parity bit P' is "1" if the number of "1"s in the 32-bit read data and the CBE signal from the PCI device 8 is odd, and "0" if the number of "1"s is even.

That is, when there is a parity error in the read data from the PCI device 18, the fact that there is a parity error in the read data is reflected in the parity bit P', which is transmitted to the PCI device 8. Similarly, when there is no parity error in the read data from the PCI device 18, the fact that there is no parity error in the read data is reflected in the parity bit P', which is transmitted to the PCI device 8.

In this way, even if the byte enable values are different on the primary-side and secondary-side buses, the parity error on the secondary-side bus 31 can be correctly transmitted to the primary-side bus 9. This function can be easily realized through addition of a simple circuit at low cost.

(Other Embodiments)

In the above-described aspects, RAID storage system controllers with a redundant configuration such as that in FIG. 2 were explained. However, application to PCI bus connection systems for other controller or other data processing devices is possible, and as the physical disks of the storage system, magnetic disks, optical discs, magneto-optical discs, and various other storage devices can be employed.

Further, the case in which the CBE signal from the PCI device 8 was "1000" was explained, but operation is similar for other bit patterns as well. Also, the case of data transfers in response to read requests from the PCI device 8 to the PCI device 18 was explained, but application to data transfers in response to read requests from the PCI device 18 to the PCI device 8 is also possible; and the PCI device 18 is not limited to an IO bridge circuit, but may be another PCI device. Here, "PCI bus" includes, in addition to a peripheral component interconnect bus, other computer buses.

In the above, embodiments of this invention have been explained, but the scope of this invention is not limited thereto; various modifications are possible, and are not excluded from the scope of this invention.

Thus in this invention, new error detection information is generated from the error detection information generated by the first device and from a byte enable signal from the second device, and the new error detection information is transferred together with the read data to the second device, so that even if byte enable values are different for the primary-side and secondary-side buses, secondary-side bus parity errors and other error detection information can be transmitted correctly to the primary-side bus. This function can be easily realized through the addition of a simple circuit, at low cost.

What is claimed is:

1. A bus bridge circuit, which issues a read request to a first device in response to a read request from a second device, receives data from said first device via a first bus, and transfers the data to said second device via a second bus, comprising:
    a data buffer, which receives and stores the data of said first device, and error detection information generated from said data and from byte enable signals specifying, in units of a prescribed number of bits, the parallel data from said bus bridge circuit on said first bus to be enabled;
    an error detection information generation circuit, which generates new error detection information from byte enable signals specifying, in units of a prescribed number of bits, the parallel data from said second device on said second bus to be enabled, and from error detection data received in said data buffer; and
    a controller, which transfers to said second device via said second bus the data of said data buffer and said new error detection information, in response to said byte enable signals of said second device.

2. The bus bridge circuit according to claim 1, wherein said controller transmits to said first device said byte enable signal in order to pre-fetch the data of said first device.

3. The bus bridge circuit according to claim 1, wherein said error detection information generation circuit comprises an XOR circuit which takes the XOR of said byte enable signal from said second device and a parity bit received in said data buffer.

4. The bus bridge circuit according to claim 1, wherein said controller transmits said byte enable signals in sequence to said first device, in response to ready signals from said first device responding to said read request sent to said first device, transmits a ready signal to said second device after storing data from said first device in said data buffer, and receives byte enable signals from said second device.

5. The bus bridge circuit according to claim 1, wherein said data buffer comprises a FIFO buffer.

6. A bus connection system comprising:
    a second device which issues read requests;
    a first device which outputs read data in response to said read requests; and
    a bus bridge circuit which is connected to said second device by a second bus and is connected to said first device by a first bus, and transfers the read data from said first device via said first bus to said second device via said second bus,
    wherein said first device outputs to said first bus said read data and error detection information generated from said data and a byte enable signals specifying, in units of a prescribed number of bits, the parallel data from said bus bridge circuit on said first bus to be enabled, and wherein said bus bridge circuit has:

a data buffer which receives and stores said read data and said error detection information from said first device;

an error detection information generation circuit which generates new error detection information from a byte enable signal specifying, in units of a prescribed number of bits, the parallel data from said second device on said second bus to be enabled, and from error detection information received in said read buffer; and a controller which transfers the data of said data buffer and said new error detection information to said second device via said second bus, in response to said byte enable signals of said second device.

7. The bus connection system according to claim 6, wherein said controller transmits to said first device said byte enable signals in order to pre-fetch the data of said first device.

8. The bus connection system according to claim 6, wherein said error detection information generation circuit comprises an XOR circuit which takes the XOR of the byte enable signals from said second device and of the error detection information received in said data buffer, and wherein said first device has an XOR circuit which generates said error detection information from said byte enable signals from said bus bridge circuit and from said read data.

9. The bus connection system according to claim 6, wherein said controller transmits said byte enable signals in sequence to said first device in response to ready signals from said first device responding to said read request sent to said first device, and after storing data from said first device in said data buffer, transmits a ready signal to said second device, and receives a byte enable signal from said second device.

10. The bus connection system according to claim 6, wherein said data buffer comprises a FIFO buffer.

11. A data error notification method for a bus bridge circuit for issuing a read request to a first device in response to a read request from a second device, receiving data from said first device via a first bus and transferring the data to said second device via a second bus, comprising:

a step of receiving and storing in a data buffer the data of said first bus and error detection information generated from said data and from byte enable signals specifying, in units of a prescribed number of bits, the parallel data from said bridge circuit on said first bus to be enabled;

an error detection information generation step of generating new error detection information from byte enable signals specifying, in units of a prescribed number of bits, the parallel data from said second device on said second bus to be enabled, and from error detection information received in said data buffer; and a step of transferring to said second device via said second bus the data of said data buffer and said new error detection information, in response to said byte enable signals of said second device.

12. The data error notification method for a bus bridge circuit according to claim 11, further comprising a step of transmitting to said first device said byte enable signals in order to pre-fetch data of said first device.

13. The data error notification method for a bus bridge circuit according to claim 11, wherein said error detection information generation step comprises a step of taking the XOR of the byte enable signals from said second device and of the error detection information received in said data buffer.

14. The data error notification method for a bus bridge circuit according to claim 11, further comprising:

a step of transmitting said byte enable signals in sequence to said first device in response to ready signals from said first device responding to said read request sent to said first device; and a step of transmitting a ready signal to said second device after storing data from said first device in said data buffer, and receiving byte enable signals from said second device.

15. The data error notification method for a bus bridge circuit according to claim 11, wherein said storage step comprises a step of storing said read data and error detection information in a data buffer which is a FIFO buffer.

* * * * *